(12) United States Patent
Collins (10) Patent No.: US 8,369,079 B2
(45) Date of Patent: Feb. 5, 2013

(54) CARRIER, STORAGE ENCLOSURE AND METHODS

(75) Inventor: Graham Collins, Louvigne-du-Desert (FR)

(73) Assignee: Xyratex Technology Limited, Havant (GB)

( * ) Notice: Subject to any disclaimer, the term of this patent is extended or adjusted under 35 U.S.C. 154(b) by 197 days.

(21) Appl. No.: 12/843,711

(22) Filed: Jul. 26, 2010

(65) Prior Publication Data

US 2012/0020007 A1    Jan. 26, 2012

(51) Int. Cl.
*H05K 7/00* (2006.01)
*A47B 95/02* (2006.01)
*G11B 33/02* (2006.01)
*G11B 33/12* (2006.01)

(52) U.S. Cl. ........... 361/679.37; 361/679.39; 312/332.1; 312/333; 369/75.21; 720/652

(58) Field of Classification Search ............... 361/679.33–679.39; 312/332.1, 312/333; 369/75.11, 75.21, 77.11
See application file for complete search history.

(56) References Cited

U.S. PATENT DOCUMENTS

| | | | | |
|---|---|---|---|---|
| 7,167,371 | B2 * | 1/2007 | Coles et al. | 361/726 |
| 7,193,856 | B2 * | 3/2007 | Hidaka | 361/725 |
| 7,283,371 | B1 * | 10/2007 | Grouell et al. | 361/741 |
| 7,304,855 | B1 * | 12/2007 | Milligan et al. | 361/724 |
| 7,443,668 | B2 * | 10/2008 | Hsu | 361/679.33 |
| 7,742,292 | B1 * | 6/2010 | Chong, Jr. | 361/679.39 |
| 7,835,148 | B2 * | 11/2010 | Tu | 361/679.39 |
| 7,948,759 | B2 * | 5/2011 | Ye | 361/727 |
| 2008/0192097 | A1 * | 8/2008 | Miyazawa et al. | 347/86 |
| 2009/0016011 | A1 | 1/2009 | Wade | 361/679.31 |
| 2010/0118484 | A1 * | 5/2010 | Sasagawa et al. | 361/679.37 |

OTHER PUBLICATIONS

U.S. Appl. No. 12/722,012, filed Mar. 11, 2010, Davis et al.

* cited by examiner

*Primary Examiner* — Zachary M Pape
(74) *Attorney, Agent, or Firm* — Pillsbury Winthrop Shaw Pittman LLP (57) ABSTRACT

There is disclosed a carrier (50) for a disk drive (100) for inserting a disk drive into a bay (22) of a storage enclosure (10), a storage enclosure and methods relating to the same. The carrier (50) comprises a housing for housing a said disk drive, and a latch member (61) slidably attached to the housing. The latch member has at least one latch part (64) for engaging with a corresponding engagement part of a said bay to latch the carrier (50) into position when the latch member (61) is slid in a latch direction to a latch position.

14 Claims, 7 Drawing Sheets

CARRIER, STORAGE ENCLOSURE AND METHODS

The present invention relates in aspects to a carrier for a disk drive, a storage enclosure, and to methods of inserting and/or removing a carrier containing a disk drive into/from a storage enclosure storage enclosures.

In preferred embodiments, the present invention relates to carriers for containing disk drives in storage enclosures, such as "redundant array of inexpensive disks" (RAID) arrays, "just a bunch of disks" (JBOD) functionality or "switched bunch of disks" (SBOD) functionality or "expander-based bunch of disks" (EBOD) functionality based on "SAS expander" technology, "storage array network" (SAN) or "network attached storage" (NAS) storage, server enclosures and the like.

The use of storage enclosures for containing disk drive units is well known in the art per se. Such enclosures are usually modular, having disk drive bays at the front of the enclosure for receiving disk drive units mounted in carriers, and bays at the rear of the enclosure for receiving various other modules, such as power supply units (PSUs), cooling modules and various electronics modules. These electronics modules typically include one or more controllers for the disk drive assemblies, providing input/output connections to the enclosure and implementing the desired functionality of the disk drives, e.g. as "just a bunch of disks" (JBOD) or an RAID array, etc. The electronics modules may also provide enclosure management services or other functionality. The various modules connect into a midplane within the enclosure. The modules are removable from the enclosure for maintenance and/or replacement. Often modules at the rear of the enclosure are provided in duplicate or more so that a certain measure of redundancy can be provided in case of failure of a module. Many different layouts and configurations of data storage enclosures are possible and, indeed, available commercially.

One important consideration in the manufacture of storage enclosures and carriers for storage enclosures is the layout and positioning of the disk drive units within the enclosure and the way in which they are inserted/removed and secured within the enclosure. It is desirable to make best use of the available space in the storage enclosure to fit in as many disk drive units as possible to increase the amount of storage the enclosure can provide. However, there are various considerations balanced against this desire to fit in as many disk drives as possible. For example, the structure of the carrier and enclosure should preferably allow the disk drive units to be easily removed from and inserted to the enclosure, possibly by "hot-swapping" the disk drives so that that the enclosure need not taken out of use while the disk drive unit is swapped. The structure must also be strong and robust enough to support the disk drive units. It is also necessary to ensure that adequate cooling is provided to the disk drive units to prevent overheating. This is usually implemented by providing a cooling airflow through the enclosure which cools the disk drive units and/or other components of the enclosure. The support structure should also therefore allow adequate airflow between the disk drive units.

In the prior art, typically the arrangement is to have a lattice of cells at the front of the enclosure into which disk drives can be inserted in carriers. Drives are slotted into the lattice through the front of the enclosure.

It is also known to provide a module with a pivoting handle to aid insertion/removal of the module from a bay. The handle has a caroming protrusion at one end, which engages with a hole in the bay. The handle may be used to lever the module into and out of the bay overcoming the insertion force of the connectors mating, and to lock the module in place once fully received in the bay. See for example the co-owned U.S. patent application Ser. No. 12/167,555, filed 3 Jul. 2008, entitled "Module And A Method Of Positioning A Module".

Whilst this system is advantageous for some applications, in other applications it is less suitable. In particular, the system needs a relatively large amount of space, where space is typically required to be used by disk drives and other electronics, and for cooling airflow to be provided in the enclosure. It also only uses a single contact point, i.e. the caroming protrusion, by which the module engages with the bay. This can lead to asymmetric forces acting on the module when being inserted or secured in the bay, which in some situations can be undesirable.

What is needed, is a way of inserting and securing a disk drive into a bay in a storage enclosure that addresses these potential drawbacks, and allows for convenient insertion and removal or disk drives whilst securing them in use.

According to a first aspect of the present invention, there is provided a carrier for a disk drive for inserting a disk drive into a bay of a storage enclosure, the carrier comprising:

a housing for housing a said disk drive;

a latch member slidably attached to the housing, the latch member having at least one latch part for engaging with a corresponding engagement part of a said bay to latch the carrier into position when the latch member is slid in a latch direction to a latch position.

This provides a secure way of attaching the carrier in a bay in the storage enclosure. The latch member can be slidably attached in any suitable way. This arrangement is susceptible of relatively simple manufacture. This arrangement can also be made small, so as to minimise the amount of space taken up by the latching mechanism so as to minimise the amount of space in the enclosure used for disk drives and other devices.

This arrangement is also simple for the user to operate. No tools are required for the carrier to be inserted/removed from the bay in the preferred embodiments. The carrier can be pushed into a suitable bay of the enclosure, and the operator can latch the carrier in place with just a simple sideways force applied to the latch member.

Preferably, the latch member is resiliently biased in the latch direction. This helps keep the latch member securely in the latch position to guard against the latch becoming inadvertently disengaged during use, for example due to vibration, etc. This can also aid the operator in engaging the latch.

Preferably, the latch part has at least one camming surface arranged such that when the carrier is inserted into a bay in an insertion direction such that the camming surface makes contact with a corresponding contact surface of the bay, the movement of the camming surface on the contact surface causes the latch member to move in the direction opposite to the latch direction against the bias. This means allows the operator to simply push the carrier into the bay, and the operation of the camming surface and the biased latch member means that the latch will automatically engage as the carrier is moved into the fully received position in the bay.

Preferably, the latch member lies adjacent to a side of the disk drive when a disk drive is received in the carrier and does not extend beyond the envelope of the disk drive by more than 5 mm in any direction perpendicular to the axis along which the latch member moves.

Preferably the latch member is closely formed to the disk drive to minimise the amount of space taken up by the latch. In a preferred embodiment, the latch mechanism does not extend more than 2.5 mm away from the disk drive (other than possibly in the latch direction). For example, the latch member can be formed from sheet metal in a preferred embodiment, which can produce a latch taking up very little additional space.

Preferably, the latch member has at least two latch parts, the carrier has two opposed ends, and the two latch parts being disposed respectively at the opposed ends.

This promotes secure latching of the disk drive by using more than one latching point spaced at opposite ends of the carrier/disk drive. Also, in embodiments where the carrier is inserted into the bay against a bias, having latching points at each end prevents the carrier from possible skewing its position in its bay, which could make removal of the carrier more difficult. This arrangement also enables simultaneous latching at each end of the carrier. The mechanism can also be made simple and small, e.g. preferably by the latch points being attached to or formed from the slidable latch member.

Preferably, the latch member has at least four latch parts, the four latch parts being located at positions corresponding to the corners of a face of the disk drive when held in the carrier.

This promotes more secure latching of the disk drive by using four latching points at the corners of the carrier. This also helps prevent the carrier from possible skewing its position in its bay.

In an embodiment, the carrier has a resiliently biased lift element arranged to bias the carrier when it is inserted into a bay in a said storage enclosure. The lift element provides resistance when inserting the carrier into the bay as the carrier is pushed into its fully received position. Preferably, the resistance starts when the carrier is partially inserted into the bay. The biasing force then increases as the carrier is pushed home. The latch mechanism described above engages at this point to keep the carrier in place against the biasing force supplied by the lift element. The biasing force can for example be applied by a spring loaded movable member that engages with the bay when the carrier is partially inserted into the bay. Thus, the carrier, when received and latched the bay effectively has a preloaded removal force.

The preload also helps keep the carrier securely in position when in its received position in the bay, for example by preventing the carrier from "rattling" and other effect of vibration being transmitted to/from the carrier/disk drive.

When the operator wishes to remove the carrier from the bay, the user releases the latch mechanism. In preferred embodiments, the user can release the latch by sliding the latch member laterally relative to the disk drive. The bias of the lift element then raises the carrier so that it is proud of the other carriers in bays in the enclosure. Thus, the user can grip the sides of the carrier, allowing quick and simple removal with minimal risk of dropping the carrier.

According to a second aspect of the present invention, there is provided a storage enclosure comprising a plurality of bays constructed and arranged to received disk drives received in carriers, at least one bay having received therein a disk drive in a carrier as described above.

According to a third aspect of the present invention, there is provided a storage enclosure comprising a plurality of bays constructed and arranged to receive disk drives received in carriers, at least one bay comprising:

an engagement part for engaging with a corresponding latch part of a latch member on a said carrier so allow the carrier to be latched into position in the bay;

a resiliently biased lift element that engages a said carrier when it is inserted into the bay so as to apply a biasing force against said disk drive as it is advanced into a received position in the bay.

The engagement part allows a latch member of the carrier to latch in position in the bay against the biasing force applied to the carrier by the lift element.

The lift element can be provided by the carrier or the bay. Preferably lift elements are provided at each end of the bay so as to provide a balanced biasing force to the carrier to help prevent the carrier skewing in position in the bay. However, in principle, the lift elements can be provided anywhere about the carrier. For example, a lift element could be provided centrally under the carrier to help lift the carrier when removing the carrier from the bay.

Preferably, engagement parts are provided at both longitudinally opposite ends of bay.

Preferably, the engagement part has a camming surface arranged such that when a carrier having a slidable latch member is inserted into the bay in an insertion direction such that a surface of the latch member makes contact with a the camming surface of the bay, the movement of the latch member on the camming surface causes the latch member to slide laterally. This helps the latch mechanism automatically engage when the carrier is inserted into the bay.

Preferably, at least one bay has received therein a disk drive in a carrier as described above.

Preferably, the bay has shaping and the housing of the carrier has shaping, wherein the shaping of the bay and of the carrier cooperate with each other to guide the carrier into and out of the received position in the bay and to hold the carrier in the received position. This helps guide the carrier into and out of the bay, as well as holding the carrier securely in position when latched in the bay.

Preferably, the shaping of the bay and the carrier is keyed to each other differently at the two ends of the bay to prevent incorrect insertion of the carrier into the bay by the operator.

According to a forth aspect of the present invention, there is provided a method of inserting a carrier containing a disk drive into a storage enclosure, the method comprising:

inserting the carrier containing the disk drive into the bay in an insertion direction against a biasing force supplied by a resiliently biased lift element of the carrier or of the bay;

sliding a latch member of the carrier so that one or more latch parts of the latch member engage with corresponding engagement parts of the bay so as to latch the carrier in the received position in the bay.

Preferably moving the latch member comprises:

engaging one or more camming surface of the latch member with one or more camming surface of the bay such that the latch member moves in a direction opposite to the latch direction as the carrier is inserted into the bay; and, once the camming surfaces are clear of each other, moving the latch member in the latch direction by the action of a resilient bias of the latch member in the latch direction.

Preferably there are latch parts at both ends of the latch member.

Preferably there are latch parts at four corners of the latch member corresponding to the positions of corners of a face of the disk drive when received in the carrier.

According to a fifth aspect of the present invention, there is provided a method of removing a carrier containing a disk drive from a storage enclosure, the method comprising:

sliding a latch member of the carrier so that one or more latch parts of the latch member disengage with corresponding engagement parts of the bay so as to release the carrier;

moving the carrier containing the disk drive at least partially out of the bay with a biasing force supplied to the carrier by a resiliently biased lift element of the carrier or of the bay; and, fully removing the carrier from the bay.

Embodiments of the present invention will now be described by way of example with reference to the accompanying drawings, in which.

Figure 1:
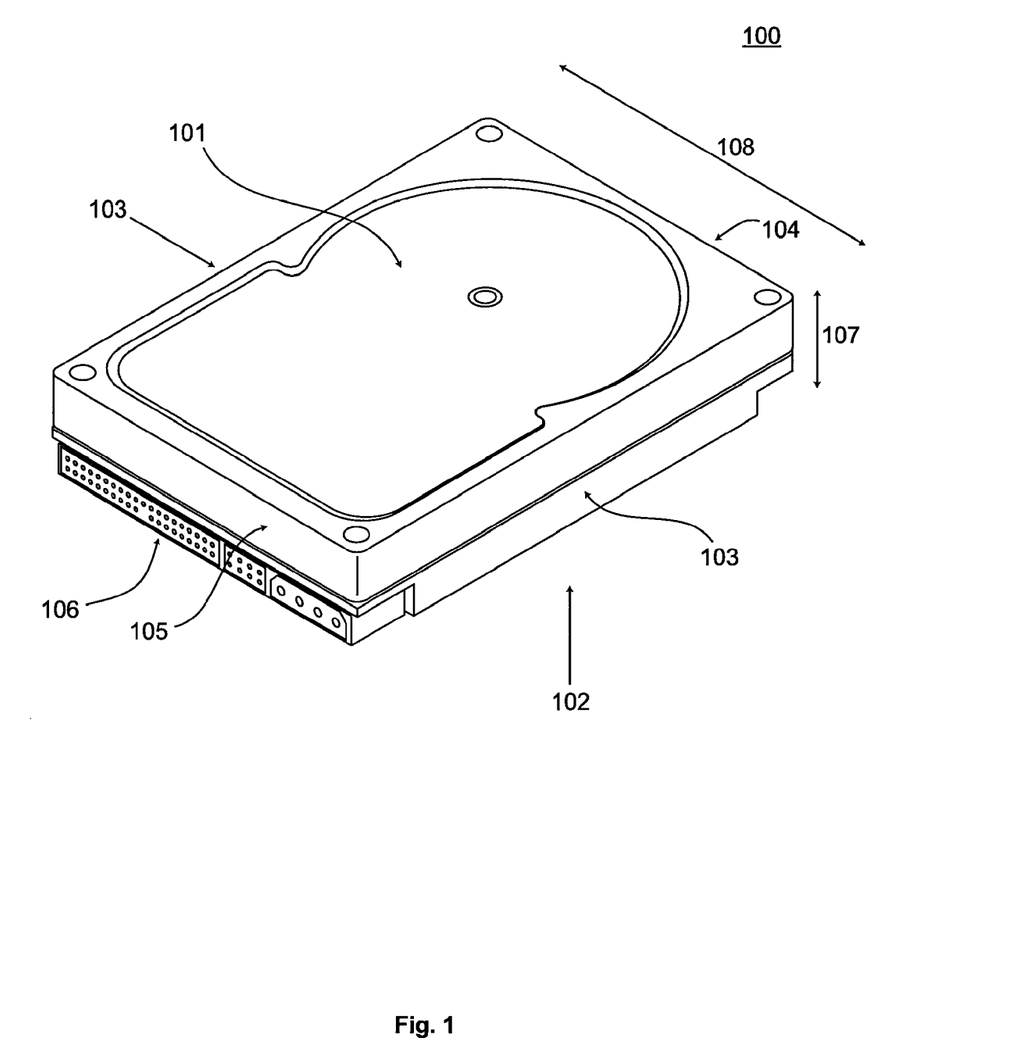
FIG. 1 shows a disk drive unit.

FIG. 1 shows an example of a 3.5 inch (88.9 mm) disk drive unit 100. The disk drive unit 100 has a top face 101, a bottom face 102, side faces 103, a front end 104 and a rear end 105. The rear end 105 holds a rearward facing connector or connectors 106 for making power and data connection to the disk drive unit 100, e.g. a SATA connector. The height 107 of the disk drive unit 100 is 26.1 mm. The width 108 of the disk drive unit 100 is 101.6 mm. These dimensions are specified in the industry standard specification (SFF-8301).

Figure 2:
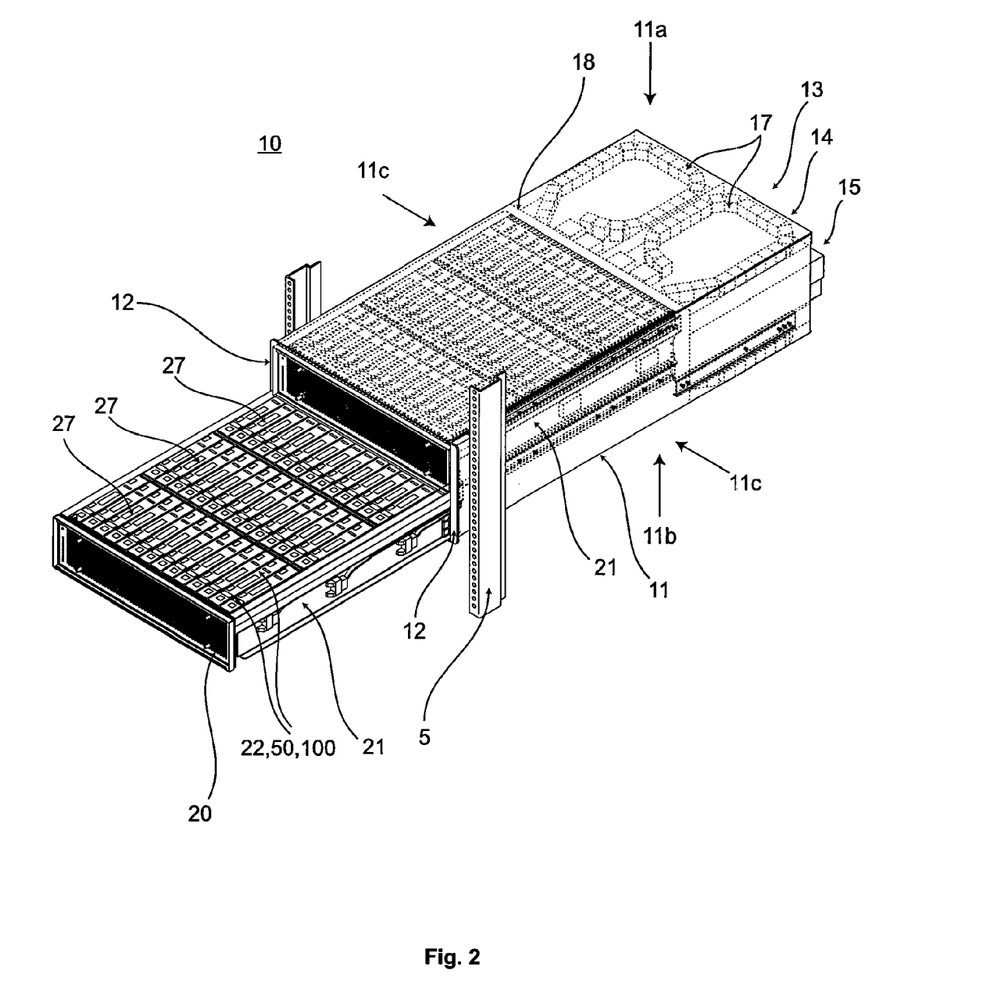
FIG. 2 shows a perspective view from the front, side and top of an example of a storage enclosure suited for use with embodiments of the present invention.

FIG. 2 shows an example of a storage enclosure 10 as disclosed in the co-owned application U.S. patent application Ser. No. 12/722,012, filed 11 Mar. 2010, entitled "Storage Enclosure, Carrier and Methods", the entire contents of which are incorporated herein by reference. This enclosure 10 has a novel and advantageous layout of and manner of supporting disk drives in the enclosure. The present invention in preferred embodiments is suitable for use with this storage enclosure 10. However, in principle, the present invention can be used with storage enclosures having other suitable layouts, and arrangements and orientations of disk drives.

As is conventional, references to "sides", "above", "below", "downward" etc, in relation to the enclosure and/or its bays are given with reference to the orientation of a conventionally mounted enclosure, i.e. one mounted laterally in a 19 inch (approx. 482.6 mm) rack. References to "above" and "side" in relation to the enclosure should be interpreted consistently with this. Nonetheless, these terms should also be construed accordingly to cover a situation where the enclosure is arranged so as to be turned on its side to be vertically arranged, or indeed in any orientation.

Briefly, the enclosure 10 comprises a housing 11 having a top face 11A, bottom face 11B, and side faces 11C. The housing also has flanges 12 for fastening the storage enclosure 10 to a rack 5. The storage enclosure 10 has a 5 U height (approx. 222.2 mm), a width sized to fit in a standard 19 inch rack (approx 48 cm) and a depth of approximately 1 m.

The front part of the storage enclosure 10 contains two drawers 20. Runners 21 positioned either side of the drawers 20 allow the drawers 20 to be moved forward and backward between a received position in the enclosure 10 (as shown by the topmost drawer 20) and a withdrawn position (as shown by the lowermost drawer 20). Each drawer 20 contains a plurality of bays 22 which are populated by disk drives 100 in carriers 50. Each drawer 20 has a single layer of bays 22 arranged in three rows of fourteen disk drives extending across the width of the drawer 20.

The rear of the enclosure 10 contains a plurality of cooling modules 13 arranged to draw cooling air through the enclosure 10 from front to rear; a plurality of power supply modules 14, for providing power to the enclosure; cables 17 for making data and power connection with the disk drives in the drawers; and a plurality of electronics modules 15, by which external connection may be made to the storage enclosure 10 and which provide the desired organisation of the disk drives 100 to the storage enclosure 10. For example, the electronics modules 15 may arrange the disk drive units 100 as a RAID array, or a JBOD (Just a Bunch Of Disks), or SBOD (Switched Bunch Of Disks), etc. A midplane 18 is disposed between the front and rear of the enclosure 10 to distribute data and power signals between the various components of the enclosure 10. The various ways of arranging modules at the rear of a storage enclosure are known in the art per se and are not described in detail herein.

Figure 3:
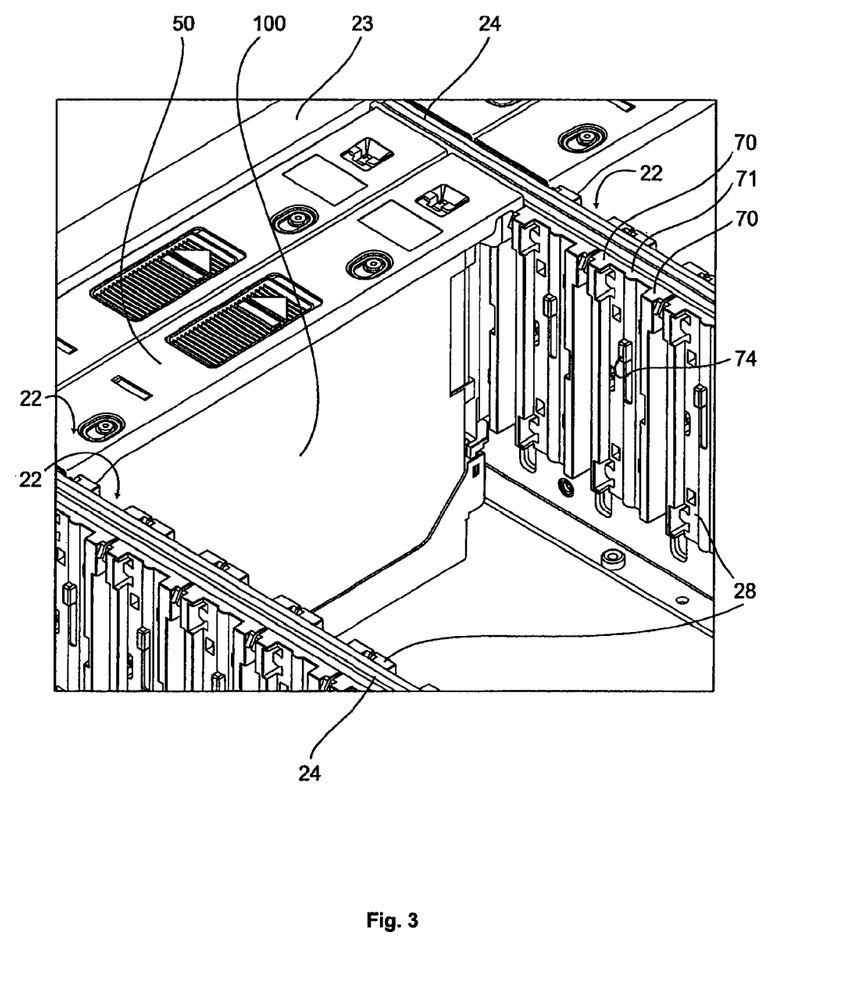
FIG. 3 shows a detail view of the drawer of FIG. 2.

FIG. 3 shows a detailed view of a drawer 20 with some bays 22 populated with disk drives 100 in carriers 50 and some bays 22 empty. The structural framework of the drawer 20 consists of side members 23 and cross members 24 running between the side members 23 so as to define three general spaces 27 (shown in FIG. 2) within the drawer 20 corresponding respectively to the three rows of disk drives 100. The cross members 24 have apertures 26, which allow cooling air to be drawn through the enclosure 10 to cool the disk drive units. Guide members 28 are attached to the cross members 24, and have shaping arranged help guide the disk drive carriers 50 into the bays 22 (described in more detail below). The guide members 28 may be manufactured for example from moulded plastics and attached to the cross members 24. Each bay 22 also has an upward facing connector (omitted from the drawings for clarity) for connecting to a disk drive inserted into that bay 22 and the drawer 20 has further circuitry and cables (omitted from the drawings for clarity) for distributing the signal between the disk drives 100 and the midplane 18.

Figure 4:
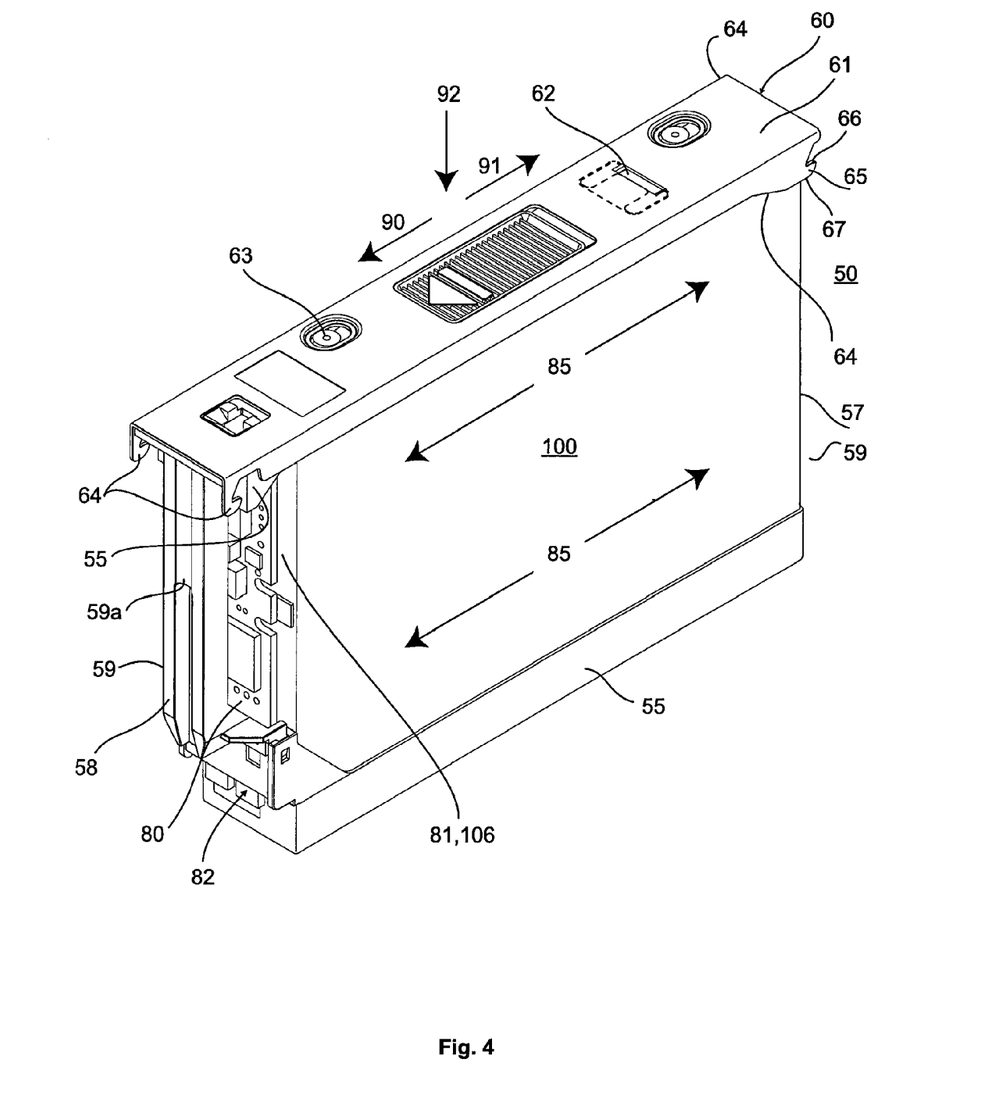
FIG. 4 shows a perspective view of an example of a carrier according to an embodiment of the present invention.

FIG. 4 shows a carrier 50 attached to a disk drive 100. The carrier 50 comprises a cage-like structure that fits around the disk drive unit 100, holding the disk drive unit 100 therein. The cage comprises a top piece 55 and a bottom piece 56, which run along the sides 103 of the disk drive 100, and a front end piece 57 and a rear end piece 58 at the front and the rear faces 104, 105 of the disk drive 100 respectively, which connect between the top piece 55 and bottom piece 56.

The front and end pieces 57, 58 have shaping 59 to reciprocate with the shaping of the guide members 28 in the bays 22 (shown by FIG. 3) in order to guide the carrier 50 into and out of a received position within the bays 22 when advanced from above. The shaping 59 also includes a downward facing surface 59a for engagement with the ejection system of the bays 22 (described below).

These pieces 55,56,57,58 may be made from for example moulded plastics. Preferably the pieces 55,56,57,58 are relatively thin in order to minimise the amount of space taken up by the carrier 50 and thus maximise the space in the enclosure 10 available for holding disk drive units.

The carrier 50 also has an adaptor board 80. The adaptor board 80 is fixed to the front end piece 57 of the carrier 50 adjacent the rear end 105 of the disk drive unit 100. The adaptor board 80 has a first connector 81 mounted on the board arranged to plug into the disk drive connector 106. The adaptor board 80 has a second connector 82 at the bottom edge of the adaptor board 80 facing downwards with the disk drive 100 oriented as shown in FIG. 4, i.e. with the disk drive on its side 103. Preferably, the second connector 82 is an edge connector. The first connector 81 and the second connector 82 are electrically connected together. Thus, when the carrier 50 is inserted into a bay 22 orientated as shown in FIG. 4 with a downward plugging direction, the second connector 82 mates to the upward facing connector in the bay 22 (not shown) and thus connects the disk drive 100 to the enclosure 10.

The top of the carrier 50 also has a latch assembly 60, comprising a latch member 61 disposed along the top side of the disk drive 100 and slidably attached to the top piece 55 of the cage so as to be slidable a short distance longitudinally along the side 103 of the disk drive 100 (arrows 91,91). The latch member 61 is shown in partial transparency in FIG. 4 to enable the top piece 55 to be seen. The latch member 61 can preferably slide at least about 5 mm. The latch member 61 is preferably thin and made from sheet metal. A spring 62 or other biasing means is provided between the latch member 61 and the top piece 55 of the cage to bias the latch member 61 in a latching direction (arrow 91). The latch member 61 has a ridged portion 63 in its centre which provides grip to the operator to allow the operator to operate the latch 60 (described below). The latch member 61 also has latch parts, which in this example take the form of hooks 64 that extend downwardly at each corner of the latch member 61 with the end of the hook 64 facing the latching direction 91, i.e. in the same direction as the one in which the latch member 61 is biased by the spring 62. The upper surface of the end of the hook 64 is generally horizontal and provides a lock surface 66. The lower surface of the end of the hook is angled to face downwardly and towards the latch direction 91 and provides a cam surface 67.

Figure 5:
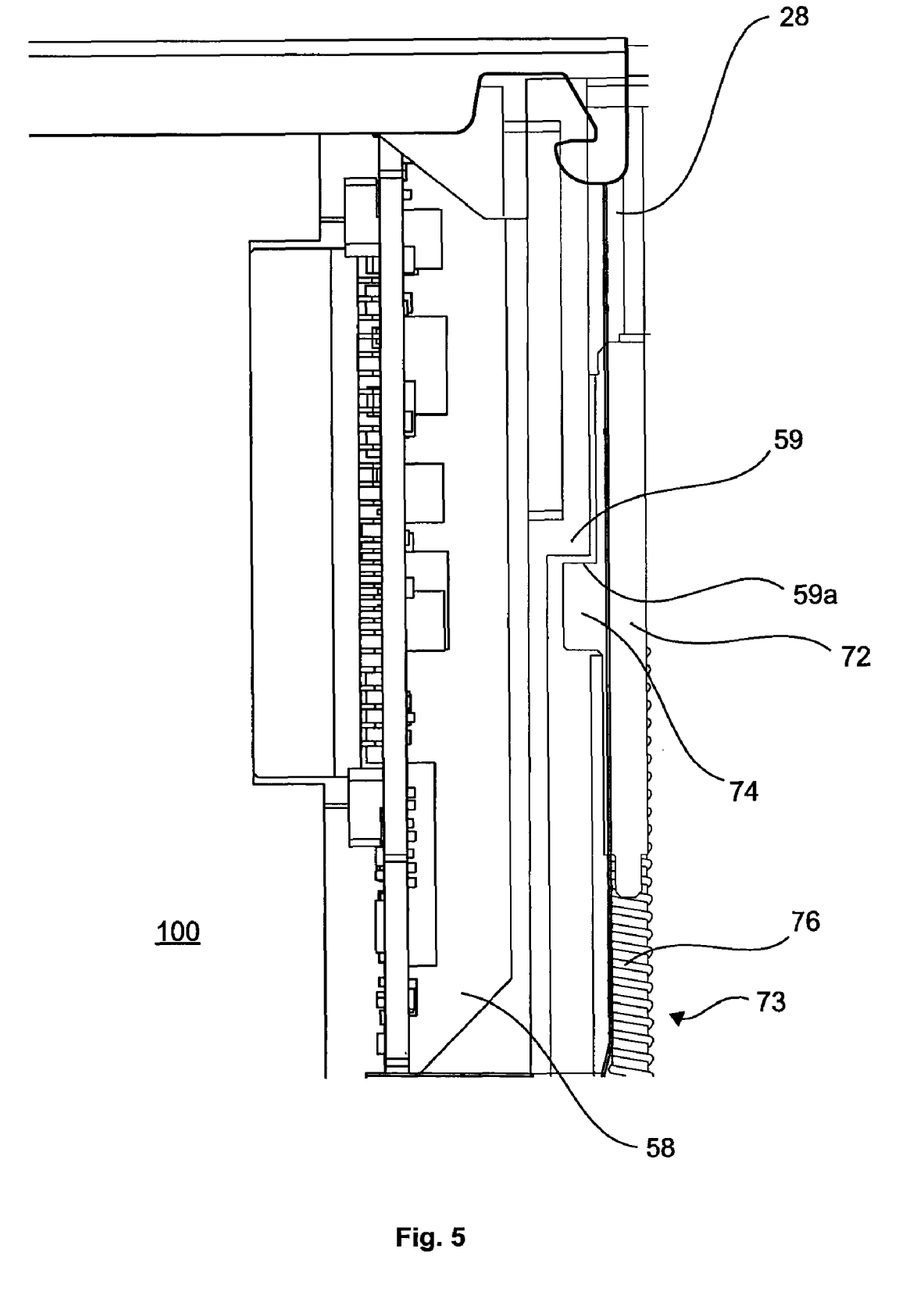
FIG. 5 shows a section view of the carrier of FIG. 4 received in a bay of the enclosure.

Turning back to FIG. 3, the shaping of the guide members 28 has, the form of a downwardly extending recessed portion 71 between two downwardly-extending protruding portions 70 in each bay 22. As can be seen from FIG. 3 and the sectional view of the guide member in FIG. 5, a lift element 72 is disposed in a cavity 73 in each guide member 28. The lift elements 72 can move up and down in the cavities 73. A finger 74 of the lift element extends through a vertical slot 75 in the recessed portion 71 of the guide member 28 so as to extend into the channel between the protruding portions 70. A spring 76, or other biasing means, disposed in the cavity 73 biases the lift element 72 upwards. The lift elements 72 are preferably provided in the guide members 28 at both ends of the bay 22.

When the carrier 50 is inserted into the bay 22, the shaping 59 of the carrier 50 is received in the channel formed between the protruding portions 70 of the guide member 28 such that the carrier 50 is guided into the bay 22 as it is advanced downwards by the operator. Preferably the channel/shaping is different at the two ends of the carrier 50 so that in effect the carrier 50 is keyed to the bay 22, preventing incorrect insertion of the carrier into the bay by the operator. When the carrier 50 is partway inserted into the bay 22, the fingers 74 of the lift elements 72 contact the bearing surfaces 59a in the front and rear pieces 57,58 of the carrier 50, so as to provide a biasing force upwards as the carrier 50 is pushed fully home into the bay 22 by the operator pressing down on the carrier 50. The lift elements 72 in the guide members 28 at the front and rear end of the bays preferably give a preload of about 4 kg.

Figure 6:
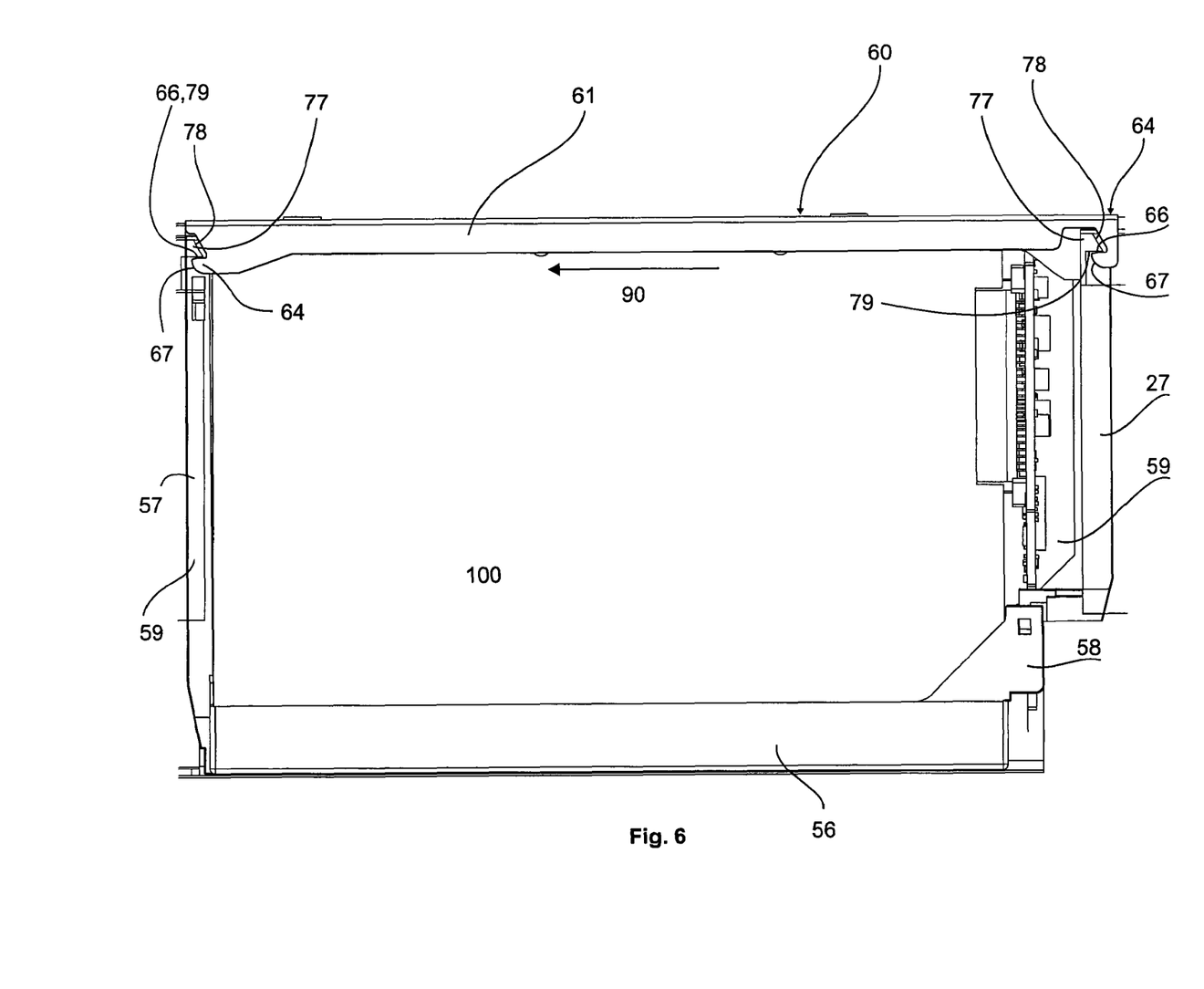
FIG. 6 shows a plan view from the side of the carrier of FIG. 4 in the latched position; and, FIG. 7 shows a plan view from the side of the carrier of FIG. 4 in the release position.
Figure 7:
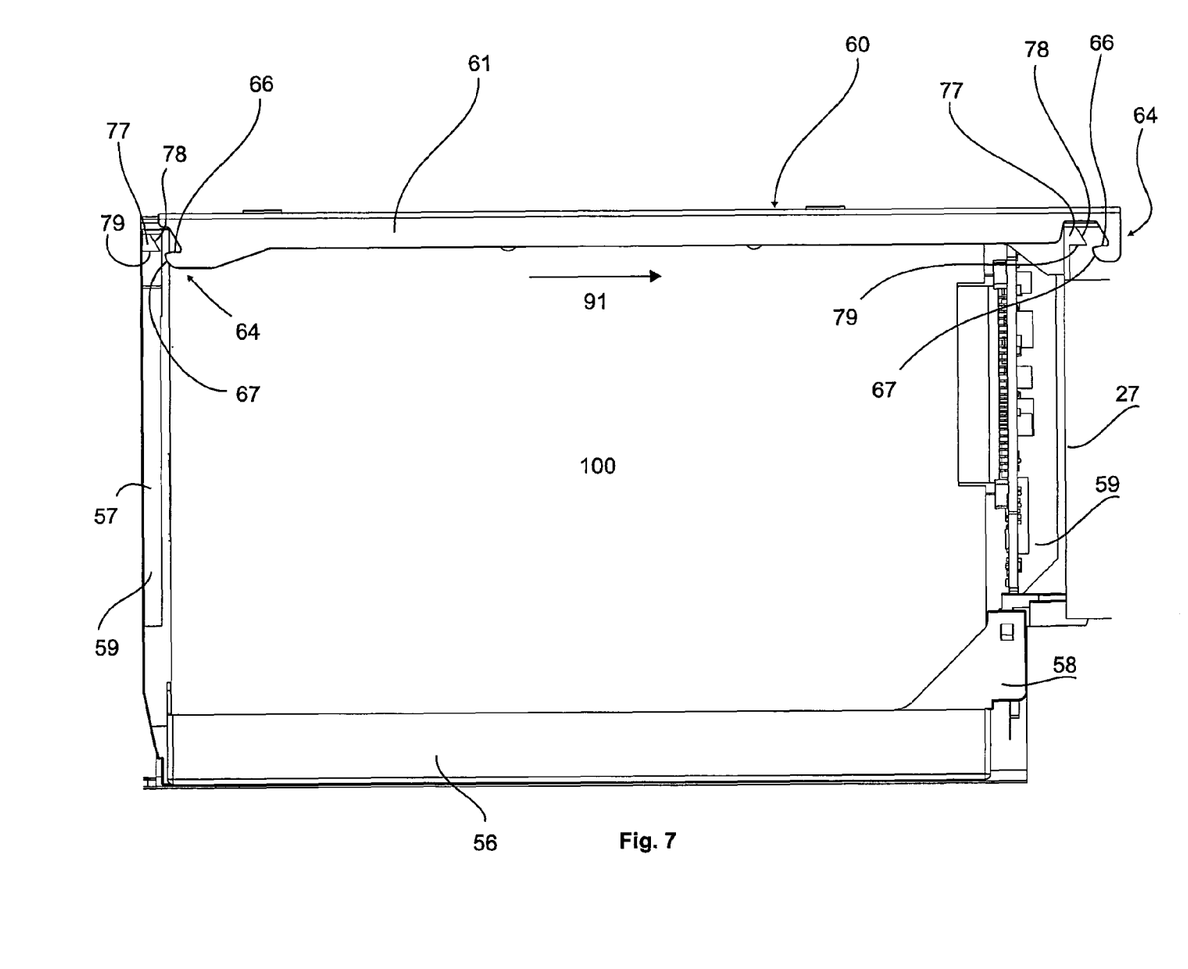

As shown in FIGS. 6 and 7, the guide members 28 have engagement part, which in this example take the form of hooks 77, for reciprocating and latching with the hooks 64 of the latch 60 of the carrier 50. The hooks 77 each have a camming surface 78 facing in the opposite direction to the camming surface 67 of the carrier hooks 64, and a lock surface 79 facing in the opposite direction to the horizontal lock surface 79 of the carrier hooks 64.

As the carrier 50 is pushed fully home, the camming surfaces 67 of the hooks 64 of the carrier 50 engage and bear against with the camming surfaces 78 of the guide members 28, causing the latch member 61 to move laterally (in the direction shown by arrow 90 in FIG. 4) against the bias of the spring 62 as the carrier 50 is pushed home until the hooks 64,77 clear each other. Once past each other, action of the spring 62 causes the latch member 61 to snap back in the latch direction 91 (shown by FIG. 4) into its locking position, wherein the lock surfaces 66 of the carrier hooks 64 are positioned underneath and facing the lock surfaces 79 of the guide member hooks 77. At this point, the operator can stop applying downward pressure on the carrier 50 and the lock surfaces 66,79 of the hooks 64,77 bearing on each other hold the carrier 50 securely in place in the bay 22 against the upward bias provided the lift element 72. This locking position is shown in FIG. 6.

If desired, a visual indicator can be provided to show the operator that the latch 60 has successfully engaged in the locked position, for example by providing a red portion somewhere on the top piece 55 which is visible when the latch 60 is in the unlocked position, but hidden by the latch member 61 when the latch 60 is in the locked position.

To remove a carrier 50 from a bay 22, the latch 60 is released by the operator sliding the latch member 61 in the release direction 90 by applying a force to the ridged portion 63 on top of the latch 60 until the hooks 64,77 are clear of each other, as shown in FIG. 7. As the operator releases the downward pressure, the lift elements 72 lift up the carrier 50 partway out of the bay 22 so as to be slightly proud of other carriers 50, allowing the sides of the carrier 50 to be gripped by the operator and thereby aiding simple removal of the carrier 50 from the enclosure 10.

Thus a way of securing a disk drive in a storage enclosure is provided. Four latch points are provided with camming surfaces to ensure that the carrier 50 self-latches when it is pushed into the bay 22. The arrangement of the latch member 61 ensures each corner of the carrier 50 is latched simultaneously.

The latch is also simple for the operator to manipulate. Once the carrier 50 is inserted into the entrance of the bay 22, the operator simply pushes down the carrier 50 by applying downward pressure to the ridged portion 63 until the carrier 50 latches in place. To remove the carrier 50, the operator simply pushes the latch member 61 to the release position by applying lateral pressure to the ridged portion 63 until the latch 60 disengages and the lift elements 72 lift the carrier 50 part way out of the bay 22, and then grasps the carrier 50 at its sides and lifts the carrier 50 to complete the removal of the carrier 50.

The preferred latch 60 has the advantage of taking very little space. In particular, the latch member 61 and top piece 55 of the carrier 50 can be arranged in a 2.2 mm high envelope in a preferred embodiment. The lateral movement of the latch member 61 between the locked and released positions is preferably more than 1 mm and less than 10 mm, and more preferably more than 2 mm and less than 5 mm, which is adequate to allow engagement and disengagement of the hooks 64,73, whilst taking up little lateral space. This is highly beneficial, since this allows disk drive units 100 to be packed more tightly in the enclosure 10, allowing more to be provided in an enclosure 10 of a given size.

Furthermore, the latch member 61 and bottom piece 56 of the carrier 50 extend around the sides of the disk drive 100 and slightly wrap around onto the top and bottom faces 101,102 of the disk drive 100 creating a channel 85 between the top and the bottom faces 101, 102 adjacent disk drive units 100 in the drawer 20 bounded by the latch member 61 and bottom piece 56 of the carrier 50. These channels 85 are aligned with the apertures 26 in the cross members 24 allowing cooling air to be drawn through the drawers 20 to cool the various disk drives 100 therein. Thus the latch 60 not only does not interfere with providing air flow to the disk drives 100, but in fact contributes to forming an airflow channel to the disk drives 100, allowing better cooling.

The carrier 50 has a single touch point to both insert and remove the disk drive from the enclosure 10, which is ridged portion 63 to enable the operator to gain traction when moving it, which provides simple operation for the operator.

Other arrangements are possible. For example, lift elements 72 can be provided at either end or both ends of the disk drive 100, or indeed other biasing means can be provided underneath the disk drive 100. The lift elements 72 can be provided by the carriers 50 rather than the guide members 28 of the bays 22. The latch mechanism 60 may have hooks for engaging with the bays 22 at different positions. Other orientations of disk drive 100 in the carrier 50 and other plugging directions are possible.

Embodiments of the present invention have been described with particular reference to the example illustrated. However, it will be appreciated that variations and modifications may be made to the examples described within the scope of the present invention.

The invention claimed is:

1. A carrier for a disk drive for inserting the disk drive into a bay of a storage enclosure, the carrier comprising:
   a housing for housing said disk drive;
   a latch member slidably attached to the housing, the latch member having at least one latch part for engaging with a corresponding engagement part of said bay to latch the carrier into position when the latch member is slid in a latch direction to a latch position,
   wherein the latch member has at least two latch parts, the carrier has two opposed ends, and the two latch parts being disposed respectively at the opposed ends, wherein the latch parts are fixed in position relative to each other such that movement of the latch member moves both latch parts in the same direction;
   wherein the latch member lies adjacent to a side of the disk drive when a disk drive is received in the carrier and does not extend beyond the envelope of the disk drive by more than 5 mm in any direction perpendicular to the axis along which the latch member moves.

2. A carrier according to claim 1, wherein the latch member is resiliently biased in the latch direction.

3. A carrier according to claim 2, wherein the latch part has at least one camming surface arranged such that when the carrier is inserted into the bay in an insertion direction such that the camming surface makes contact with a corresponding contact surface of the bay, the movement of the camming surface on the contact surface causes the latch member to move in the direction opposite to the latch direction against the bias.

4. A carrier according to claim 1, wherein the latch member has at least four latch parts, the four latch parts being located at positions corresponding to the corners of a face of the disk drive when held in the carrier.

5. A storage enclosure comprising a plurality of bays constructed and arranged to receive disk drives received in carriers, at least one bay having received therein a disk drive in a carrier according to claim 1.

6. A storage enclosure according to claim 5, wherein the bay has shaping and the housing of the carrier has shaping, wherein the shaping of the bay and of the carrier cooperate with each other to guide the carrier into and out of the received position in the bay and to hold the carrier in the received position.

7. A storage enclosure according to claim 6, wherein the shaping of the bay and the carrier is keyed to each other differently at the two ends of the bay to prevent incorrect insertion of the carrier into the bay by the operator.

8. A storage enclosure comprising a plurality of bays constructed and arranged to receive disk drives received in carriers, at least one bay comprising:
   at least one engagement part for engaging with a corresponding latch part of a latch member on said carrier to allow the carrier to be latched into position in the bay, wherein the engagement parts are provided at least at both longitudinally opposite ends of the bay, wherein the engagement parts are engageable with the latch parts by moving the latch member in the same direction;
   a resiliently biased lift element that engages said carrier when it is inserted into the bay so as to apply a biasing force against said disk drive as it is advanced into a received position in the bay, wherein the disk drives occupy a disk drive volume when received in a bay and wherein the engagement parts are positioned such that they generally do not extend beyond the top of the disk drive volume.

9. A storage enclosure according to claim 8, wherein the engagement part has a camming surface arranged such that when the carrier having the latch member is inserted into the bay in an insertion direction such that a surface of the latch member makes contact with the camming surface of the bay, the movement of the latch member on the camming surface causes the latch member to slide laterally.

10. A storage enclosure according to claim 8, wherein the at least one bay has received therein one of the disk drives in one of the carriers that includes a housing for housing one of said disk drives, said latch member of one of said carriers slidably attached to the housing.

11. A method of inserting a carrier containing a disk drive into a storage enclosure, the method comprising:
    inserting the carrier containing the disk drive into the bay in an insertion direction against a biasing force supplied by a resiliently biased lift element of the carrier or of the bay;
    sliding a latch member of the carrier so that one or more latch parts of the latch member engage with corresponding engagement parts of the bay so as to latch the carrier in the received position in the bay,
    wherein the latch member has at least two latch parts, the carrier has two opposed ends, and the two latch parts being disposed respectively at the opposed ends, wherein the latch parts are fixed in position relative to each other such that movement of the latch member moves both latch parts in the same direction,
    wherein the latch member lies adjacent to a side of the disk drive when a disk drive is received in the carrier and does not extend beyond the envelope of the disk drive by more than 5 mm in any direction perpendicular to the axis along which the latch member moves.

12. A method according to claim 11, wherein moving the latch member comprises:
    engaging one or more camming surface of the latch member with one or more camming surface of the bay such that the latch member moves in a direction opposite to the latch direction as the carrier is inserted into the bay; and,
    once the camming surfaces are clear of each other, moving the latch member in the latch direction by the action of a resilient bias of the latch member in the latch direction.

13. A method according to claim 11, wherein there are latch parts at four corners of the latch member corresponding to the positions of corners of a face of the disk drive when received in the carrier.

14. A method of removing a carrier containing a disk drive from a storage enclosure, the method comprising:
   sliding a latch member of the carrier so that one or more latch parts of the latch member disengage with corresponding engagement parts of the bay so as to release the carrier,
   wherein the latch member has at least two latch parts, the carrier has two opposed ends, and the two latch parts being disposed respectively at the opposed ends, wherein the latch parts are fixed in position relative to each other such that movement of the latch member moves both latch parts in the same direction,
   wherein the latch member lies adjacent to a side of the disk drive when the disk drive is received in the carrier and does not extend beyond the envelope of the disk drive by more than 5 mm in any direction perpendicular to the axis along which the latch member moves;
   moving the carrier containing the disk drive at least partially out of the bay with a biasing force supplied to the carrier by a resiliently biased lift element of the carrier or of the bay; and,
   fully removing the carrier from the bay.

* * * * *